No. 683,095. Patented Sept. 24, 1901.
T. A. WOOLEY & H. FOX.
MACHINE FOR SHOCKING GRAIN.
(Application filed Oct. 15, 1900.)

(No Model.) 5 Sheets—Sheet 1.

Witnesses.
John Leggett
R. H. Hendry

Inventors.
Thomas A. Wooley
and Herbert Fox.
By John H. Hendry, Atty.

No. 683,095. Patented Sept. 24, 1901.
T. A. WOOLEY & H. FOX.
MACHINE FOR SHOCKING GRAIN.
(Application filed Oct. 15, 1900.)

(No Model.) 5 Sheets—Sheet 3.

No. 683,095. Patented Sept. 24, 1901.
T. A. WOOLEY & H. FOX.
MACHINE FOR SHOCKING GRAIN.
(Application filed Oct. 15, 1900.)
(No Model.) 5 Sheets—Sheet 4.

Fig. VI.

Fig. VII.

Fig. VIII.

Fig. IX.

No. 683,095. Patented Sept. 24, 1901.
T. A. WOOLEY & H. FOX.
MACHINE FOR SHOCKING GRAIN.
(Application filed Oct. 15, 1900.)

(No Model.) 5 Sheets—Sheet 5.

Fig. XII. Fig. XIV. Fig. XIII.

Witnesses Inventors.

UNITED STATES PATENT OFFICE.

THOMAS A. WOOLEY AND HERBERT FOX, OF HAMILTON, CANADA.

MACHINE FOR SHOCKING GRAIN.

SPECIFICATION forming part of Letters Patent No. 683,095, dated September 24, 1901.

Application filed October 15, 1900. Serial No. 33,069. (No model.)

*To all whom it may concern:*

Be it known that we, THOMAS A. WOOLEY and HERBERT FOX, citizens of Canada, residing at Hamilton, in the county of Wentworth and Province of Ontario, Canada, have invented certain new and useful Improvements in Machines for Shocking Grain; and we do hereby declare the following to be a full, clear, and exact description of the invention, such as will enable others skilled in the art to which it appertains to make and use the same.

Our invention relates to improvements in machines for shocking grain in which a certain machine, comprising a sheaf-receiving end and a shock forming, binding, and discharging end, is attached to the sheaf-discharge side of a reaping and binding machine in such a manner that the shock-machine shall be capable of receiving sheaves and forming the same into shocks in vertical position on the machine and discharging said shocks when bound in succession in vertical position on the ground.

The object of our invention is to provide a machine that shall be capable of attachment to the sheaf-discharge side of a reaper and binder and operated by mechanism connected to said binder to receive the sheaves to form the same into shocks, bind, and to discharge the same on their butt-ends successively. We attain this object by the mechanism illustrated in the accompanying drawings, in which—

Fig. 2 is a side elevation of the same, showing that side of the machine which is next to the binder.

Similar characters refer to similar parts throughout the several views.

In the drawings, the angle-iron frame of the shocking-machine is indicated by A and is attached to a reaping and binding machine B by means of the carrying-tube C, connected thereto. This tube extends transversely underneath the frame A and beyond. This tube fits into opposite openings of the adjusting-bars D, having a series of recesses to admit said tube, said bars D being fastened to the under side of the sheaf-receiving end of the frame A. These openings or recesses in said bars D are to allow end adjustment to the machine and to retain the same in position, and a pin 3, through the outer part of said tube, and a strap 4 on the tube and close to the inner side of the frame holds the machine to position sidewise.

Figure 1:
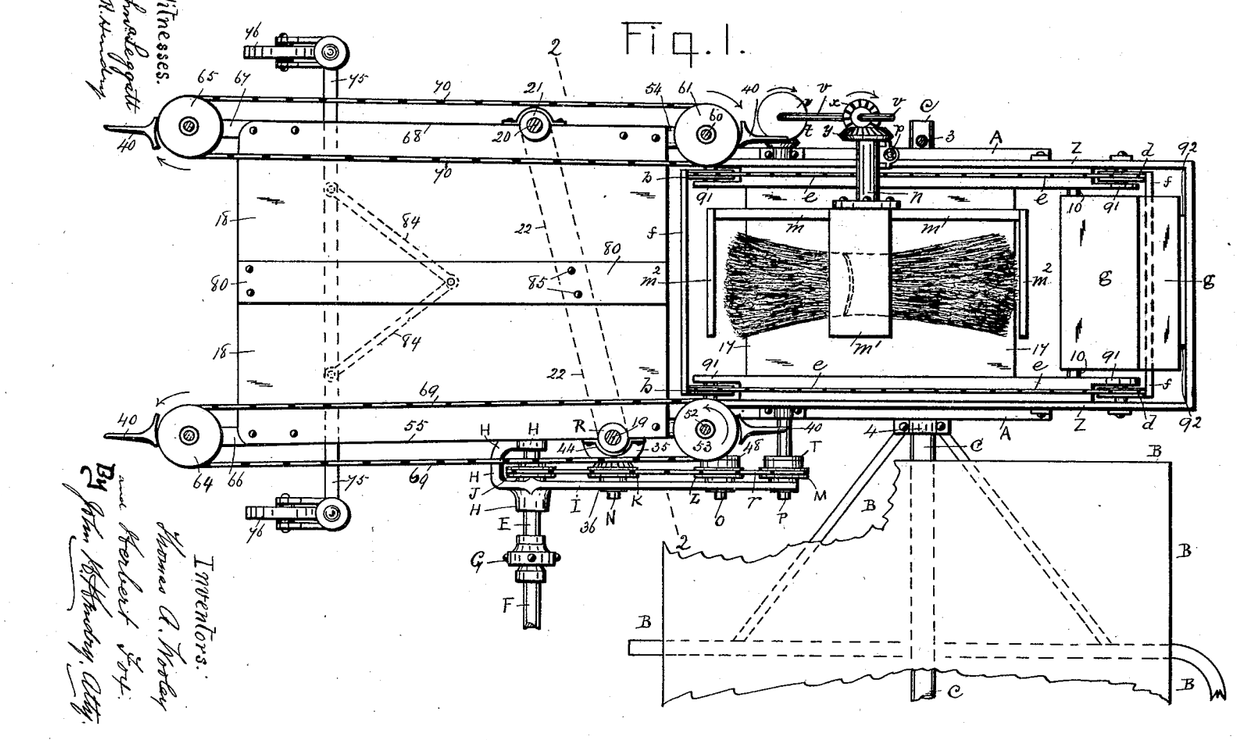
Figure 1 is a plan of our shocking-machine shown attached to the sheaf-discharge side of a binder and in position that the sheaf-receiving end of the shocker shall be capable of receiving the sheaves in succession from the binder.
Figure 3:
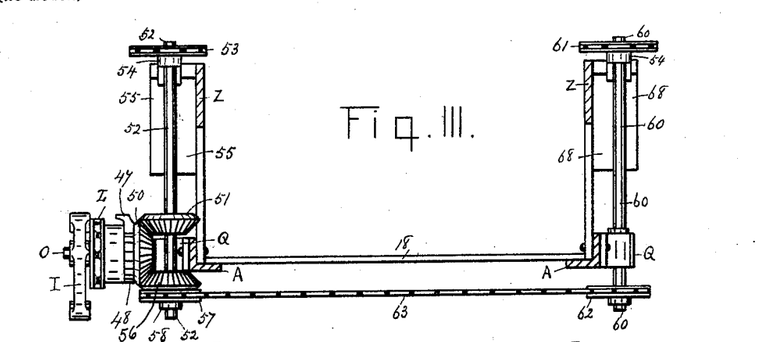
Fig. 3 is an enlarged end elevation of the same through the broken line X X, as seen in Fig. 2 of the drawings. This view shows particularly the sprockets, clutch, and gear-wheels to operate the shock-discharging arms.
Figure 4:
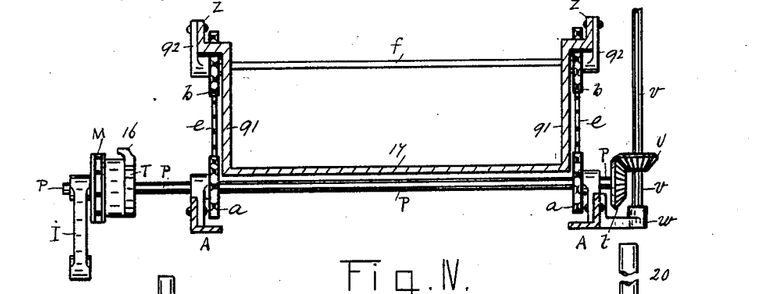
Fig. 4 is an enlarged end elevation of the machine through the broken line V V, as seen in Fig. 2, showing the transverse shaft with its sprocket and clutch and the rear upper connecting-sprockets over which the chains with their two transverse slats travel to bring in the sheaves.
Figures 6, 7:
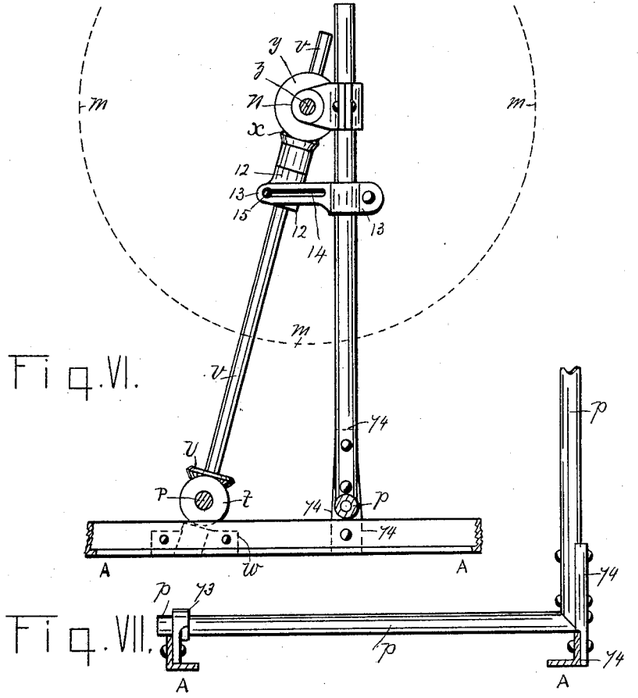
Fig. 6 is an enlarged side elevation of the rigid vertical tube which supports the sheaf-placing reel and mechanism to revolve the same, the broken dotted lines representing the circumferential line or passage of said reel.
Fig. 7 is an enlarged end elevation of the same vertical tube shown fastened to the frame, the vertical part of the tube being broken.

E is the drive-shaft of the shocker and is connected to a shaft of a binder by means of a shaft F and universal coupling G, as in Fig. 1 of the drawings. This shaft E is supported by the bracket-bearing H, fastened to the frame A and the connected bearing I, which is a part of said bracket. The shaft E is continuously revolved by the operation of the binder. A sprocket J, secured on shaft E, drives the sprockets K, L, and M by means of the chain $r$. Said sprockets revolve loosely on their respective shafts N, O, and P. The ends of shafts N and O are supported by said bearing I, and the end of this bearing I is supported by said shaft P. The bearing I is a part of the bracket-bearing H. The shaft P extends transversely through the machine and underneath the floor of the sheaf-receiving end. The shaft O extends into bearing Q, fastened to frame A, as seen in Fig. 3, and the transverse shaft N extends into the transverse bearing of the lower part of the knotter-column R. The sheaves as discharged from the binder into the receiving end of the shocker engage the trip-lever S (shown in Fig. 2) and release the clutch T, which is secured on shaft P, thus causing the shaft P to revolve by means of the continuous running of the sprocket-wheel which forms a part of the box of the clutch. This is accomplished through the medium of the said lever S, being journaled at $3^a$ and 4 to the support U, which is fastened to the end of the machine. This lever is bent to form a crank 5, to which is connected the rod W, which is pivoted at 6 to the stop-lever Y, which is pivoted at 7 to a strap 8, fastened to the upper part of the side Z of the receiving end of the machine. The said lever Y is brought back to normal position by branch 9 on the lever Y engaging the transverse bars $f$. This clutch T is released for the purpose of revolving its shaft P, which revolves the sprockets $a$ and $a$, secured on said shaft and shown in Fig. 4. The construction of the clutch T is shown on a larger scale in Figs. 11, 12, 13, and 14 of the drawings. The box part of the clutch is a part of the sprocket M, being cast to the same. The clutch T has a pivoted catch 16 and a spring 96, which tends to force the catch to engagement with the teeth 97 of the box. When the catch is released by the rod Y disengaging from the catch, the catch is then forced by means of the inner spring to engagement with the teeth of the box part of the clutch in order to revolve the shaft P, to which is secured the clutch part with its spring-catch. These sprockets $a$ $a$ revolve the carrying-sprockets $b$ $b$ and $d$ $d$ by means of the sprocket-chains $e$ $e$. These sprockets are journaled in strap-bearings, secured to the sides Z of the receiving end of the machine. These sides Z are secured to the frame A by means of straps 88 and 89, which are secured to the frame A and to the sides Z. The sheaf-receptacle or receiving end of the machine is provided with sides 91, projecting inward from the sides Z and supported by the said sides Z and partially or fully cover the inner sides of the sprockets $b$ $b$ and $d$ $d$ to shield said sprockets and prevent the straw from winding with the sprockets, said sprockets revolving in spaces formed between the said sides Z and the inner sides 91. These inner sides, together with the floor 17, form the sheaf-receptacle. The sprocket-chains $e$ run under side guide-rollers 93, pivoted to the lower part of the sheaf-receptacle, and carry two transverse slats $f$, (seen in Figs. 1 and 2 of the drawings at rest.) These slats $f$ when in operation alternately engage the transverse spring-board $g$, which is pivoted at 10 and 10 to the sides 91 of the sheaf-receptacle, as seen in Fig. 2. This spring-board is provided with coil tension-springs $h$, secured on its pivotal center to force the board by the inherent resiliency of the springs to its normal position—that is, toward the incoming transverse slat when said board is released by the said alternately-operating transverse slat. The outer edge of said spring-board follows the circular broken lines, as shown in Fig. 2, and when said spring-board is at rest and in its normal position the outer edge of the spring-board rests on a stop 92 on the lower inside part of the receiving end of the sheaf-receptacle. The spring-board is for the purpose of engaging the butt-end of the sheaf. When discharged from the binder, the transverse slat $f$ immediately engages said sheaf and assists the reel in placing the sheaf in vertical position in the shock-receptacle of the machine. As the sheaves are discharged from the binder the head parts of the sheaves fall upon the lower blade $m'$ of the reel $m$. Said blade raises the heads of the sheaves. The blade $m^2$, which follows in conjunction with the slats $f$, places the sheaves in vertical position in the shock-receptacle. The said revolving reel has a transverse shaft $z$, journaled in a transverse bearing $n$, which is capable of vertical adjustment on the vertical portion of the tube $p$, the lower part of which extends transversely and is fastened to the frame A by means of straps 73 and 74, secured to the frame A, as seen in Fig. 7. The reel is revolved by a bevel-gear $t$, secured to the outer end of the aforesaid shaft P. The wheel $t$ revolves the gear-wheel $u$, secured on the incline shaft $v$ in lower bearing $w$, which projects beyond the side of the frame and is secured to the frame A, as seen in Fig. 4. An upper bevel-wheel $x$ is secured to this incline shaft and gears into a bevel-wheel $y$, secured on the reel-shaft. The wheel $t$ on shaft P has one-half the number of teeth as the wheel $u$ on the inclined shaft $v$. Consequently the shaft $u$ makes one revolution while the shaft P makes two revolutions. The wheel $y$ on the reel-shaft has twice the number of teeth as the wheel $x$ on shaft $v$ to allow the reel on its shaft $z$ to make one half-turn to one revolution of the incline shaft $v$. The upper part of the said incline shaft has a sleeve 12, connected to an arm 13, which is capable of vertical adjustment on the vertical tube $p$. This arm 13 has a slot 14, which allows said sleeve 12 to have connection with said arm. The reel is shown in its lowest position, as in Fig. 6, and when desirable to raise the same to suit longer grain the reel is raised by means of the upper adjustable bearing $n$ on the vertical tube $p$, and also raising the said arm 13 on said tube $p$ the said slot allows for said adjustment. The screw or bolt 15, which fastens the said slotted arm to the sleeve or bearing 12, is shown in extreme outward position in the slot, showing how the reel $m$, with its bearing $n$, may be raised, and also the slotted arm 13, the sleeve 12, and the gear-wheel $x$ underneath the gear-wheel $y$, in order that the said gears $x$ and $y$ may be in gear when the reel is raised. At each reception of a sheaf the aforesaid reel and the chains $e\ e$, with their transverse slats, each make a half-revolution. This half-revolution of the reel is terminated by means of one of the transverse slats $f$ engaging with the branch 9 of the lever Y as the said slats revolve. This engagement of the transverse slats with the branch 9 causes the lever Y to engage the catch 16 on the clutch T of the shaft P to stop said shaft. Consequently the reel is stopped at the half-revolution, and so on at the reception of each sheaf.

The sheaf-receptacle comprises the floor 17 and the sides Z. The shock-receptacle comprises the floor 18 and the sides Z. These two floors are apart or separated to allow an opening for the transverse slats to operate. When the required quantity of sheaves are placed in vertical position by the aforesaid reel and transverse slats in the said shock-receptacle, the shock is bound by mechanism hereinafter specified.

Figure 5:
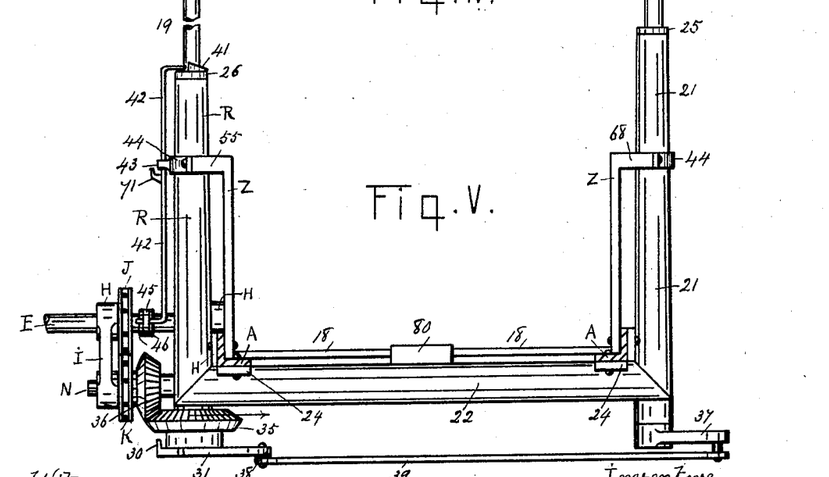
Fig. 5 is an enlarged end elevation of the machine through the oblique broken line 2 2, as seen in Fig. 1 of the drawings. This view shows the needle and knotter shafts, the sprocket and clutch, and the bevel-gearing of the knotter-shaft.

19 is the knotter-shaft, with collar 26, and supported by and capable of revolving in the vertical column R. 20 is the needle-shaft, with collar 25, and is supported by and capable of oscillating in the vertical column 21. These two columns R and 21 are in oblique position and connected by the oblique tube 22, which is a part of said columns, and fastened to the frame A by means of lugs 24 and 24, which are bolted to the frame, as seen in Fig. 5 of the drawings. The needle and the knotter shafts are suitably located in proximity to the shock-receptacle to bind the shock. To bind the shock, a stop-rod 27 is pivoted at 28 to an arm 29, which is fastened to the frame A. The end of this rod 27 butts against a catch 30 on clutch 31, secured on the lower end of the knotter-shaft 19, as seen in Figs. 2 and 5. The clutch 31 is similar in construction to the clutch T on shaft P. When this rod 27 is raised, by means of approved mechanism or by means of a cord or chain connected to said rod at 32 and controlled by the driver, the catch 30 on clutch 31 is released. This releasing of the clutch 31 allows the needle-shaft 19 to revolve once. This rod 27 is held in position by means of a bolt 33, secured to the frame A and to said rod, said bolt being provided with a spiral tension push-spring 34. To revolve this knotter-shaft 19, a gear-wheel 35 at the lower end of the knotter-shaft is provided, which runs loosely on said knotter-shaft. This wheel 35 is driven by a gear-wheel 36 on the previously-mentioned shaft N. This gear-wheel 36 is a part of the sprocket-wheel K. The wheel 36 and the sprocket K run loosely together on shaft N. This sprocket K is driven by the previously-mentioned chain $r$, which is continuously driven by the sprocket J on driving-shaft E. At the same time that the knotter-shaft is revolved the needle-shaft 20 is oscillated by means hereinafter specified. This needle-shaft is supported by column 21, as previously mentioned, and is oscillated by means of a crank 37, secured to the lower end of the needle-shaft 20. This crank 37 is connected to the crank 38 by means of the connecting-rod 39. The crank 38 is a part of the clutch 31, which is secured at the lower end of the knotter-shaft 19. While the said needle and the knotter shafts are in operation, the shock-discharge arms 40 are given one half-revolution—that is, the said arms 40 change position from the receiving end of the shock-receptacle to the discharging end of said receptacle at each operation. It will be observed that the sides of this shock-receptacle incline toward the discharge end thereof, as do also the flanges of the sides on which are the strap-bearings which support the end sprockets. Consequently the chain, with arms 40, follows the same incline as said flanges. This feature is to have a tendency to bring the shock toward the floor of the shock-receptacle while discharging the shock and to assist the shock in its descent upon the ground in vertical position. The operation of the said sprocket-chains, with arms, will be accomplished by means of the following mechanism:

On the collar 26 of the knotter-shaft 19 is a cam 41, which raises the vertical rod 42, which is capable of sliding through the bearing 43, which is a part of one of the straps 44, which secure the sides Z of the shock-receptacle to the columns. The lower end of the vertical rod 42 is pivotally connected to the horizontally-inclined stop-bar 45, which is loosely connected on the drive-shaft E, as seen in Fig. 5 of the drawings. This stop-bar 45 is held in loose position on the shaft E by means of side collars 46 on said shaft. The other end of this bar 45 engages a catch 47 on the clutch 48, which is secured on the previously-mentioned shaft O. When the rod 42 is raised by means of the knotter-shaft collar-cam 41, the stop-bar 45 is also raised. Consequently the catch 47 of clutch 48 is released. This clutch 48 is secured on shaft O, causing the same to revolve. In order to operate the aforesaid discharge-arms 40, the shaft O is provided with a gear-wheel 50, which is secured on said shaft. Said wheel 50 gears into the wheel 51, secured on the inclined discharging-shaft 52, and drives the same, together with the sprocket 53, secured on the upper part of said shaft 52, which is supported in bearing Q, attached to the frame A, and by the projecting bearing 54, which is secured to the flange 55 of the shock-receptacle side Z of the machine, which said receptacle gradually widens to the discharging end. Said sides Z are secured to the frame A by straps 89 near to the needle and the knotter-columns and by straps 90 at the shock-discharging end of the machine. The lower part of shaft 52 has a gear-wheel 56, with lower sprocket 57, which is a part of said gear-wheel 56 and run together loosely on their shaft 52 by means of the wheel 50 meshing into said wheel 56. The sprocket 57 rests on the collar 58 of the shaft 52. A similar inclined shaft 60 is provided on the opposite side of the machine in direct transverse line and is supported by a bearing Q and a strap-bearing 54, similar to the bearing 54 of shaft 52. The upper part of this shaft 60 has a sprocket 61 and a lower sprocket 62, both of which are secured to said shaft 60 and are in direct line with sprockets 53 and 57 on shaft 52. The sprocket 57 drives the sprocket 62 by means of the transversely-running chain 63. This arrangement causes the sprockets 53 and 61 to revolve inwardly. At the discharging end of the machine sprockets 64 and 65 are pivoted to the projecting bearings 66 and 67, secured on the end of the strengthening sprocket-supporting flanges 55 and 68 of the sides Z of the machine. The sprockets 53 and 61 drive the sprockets 64 and 65 by means of their respective chains 69 and 70. These chains carry the attached arms 40, previously referred to, and revolve the same one half-revolution. This half-revolution of the arms 40 is accomplished by means of the incline lip 71 on the previously-referred-to vertical rod 42, as seen in Figs. 2 and 5. As an arm 40 is moving toward the receiving end it engages with the said incline lip 71, depressing the vertical rod 42, therefore depressing the stop-bar 45, that said bar 45 may engage the catch 47 on clutch 48, secured on shaft O, to stop the same, therefore stopping the discharge-arms 40 at the proper position at each one-half revolution of said arms 40, and so on at the discharge of each shock. The clutch 48 is in reversed construction to the clutch T on shaft P.

Figure 8:
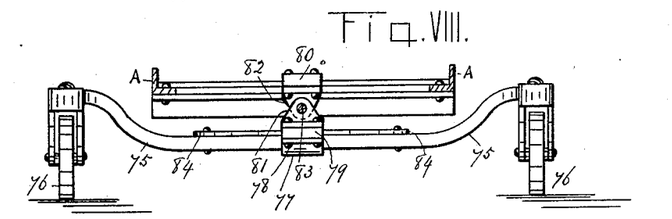
Fig. 8 is an end elevation of swivel caster-wheels, showing attachment of same to the frame. This view is delineated to conform to Figs. 1 and 2 of the drawings.
Figure 9:
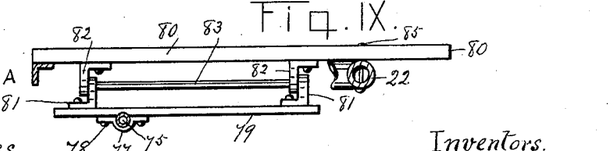
Fig. 9 is a side elevation through the central part of Fig. 8.
Figure 10:
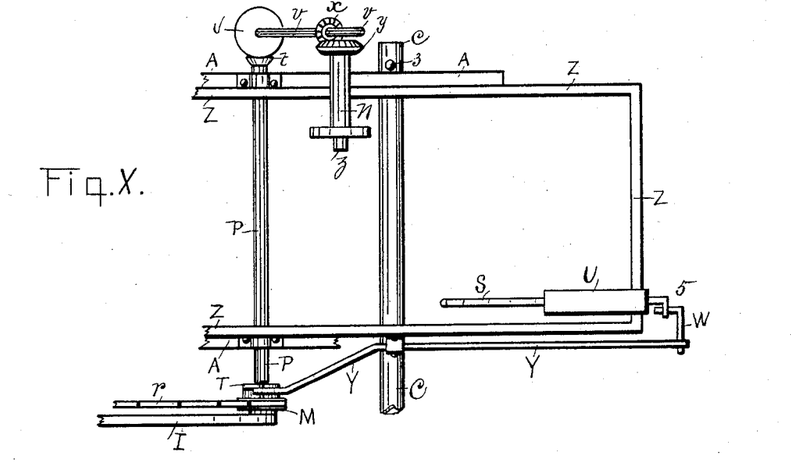
Fig. 10 is a plan of a part of the sheaf-receiving end of the shocker, showing the clutch-operating parts and the proportionate gearing which drives the reel.
Figure 11:
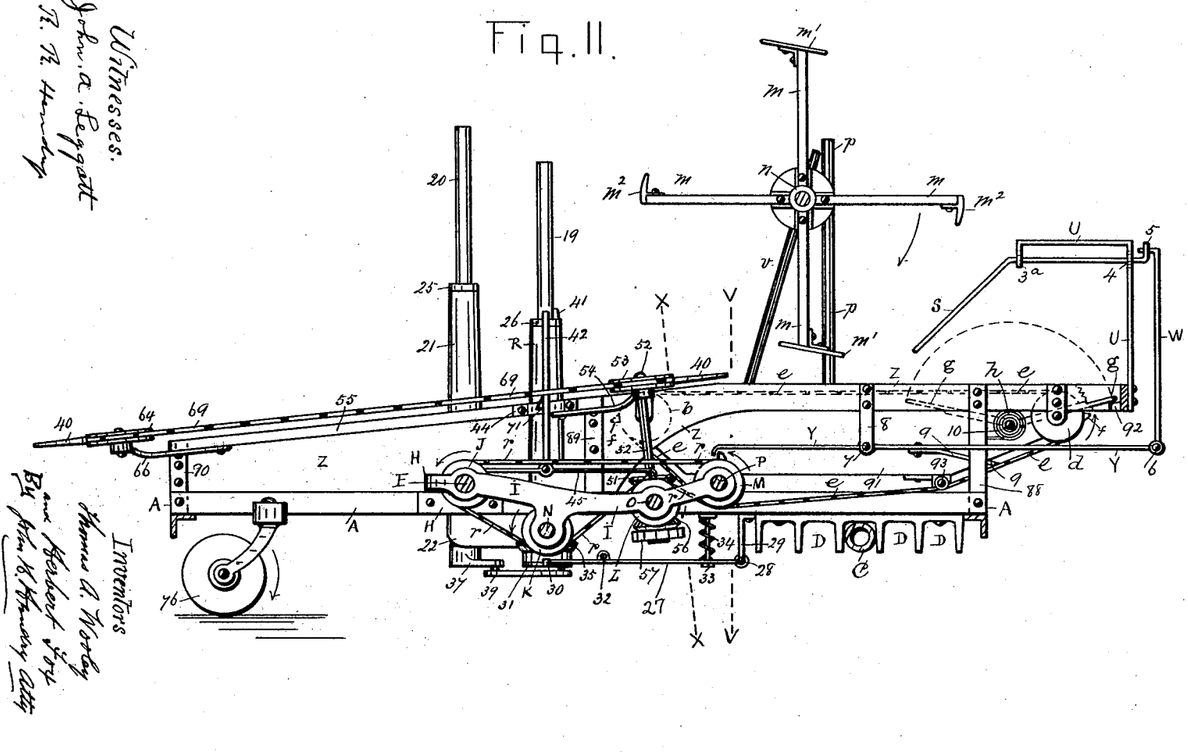
Fig. 11 is an enlarged plan of a clutch with its projecting catch. The box part of the clutch forms a part of the sprocket-wheel.
Figures 11, 12, 13, 14:
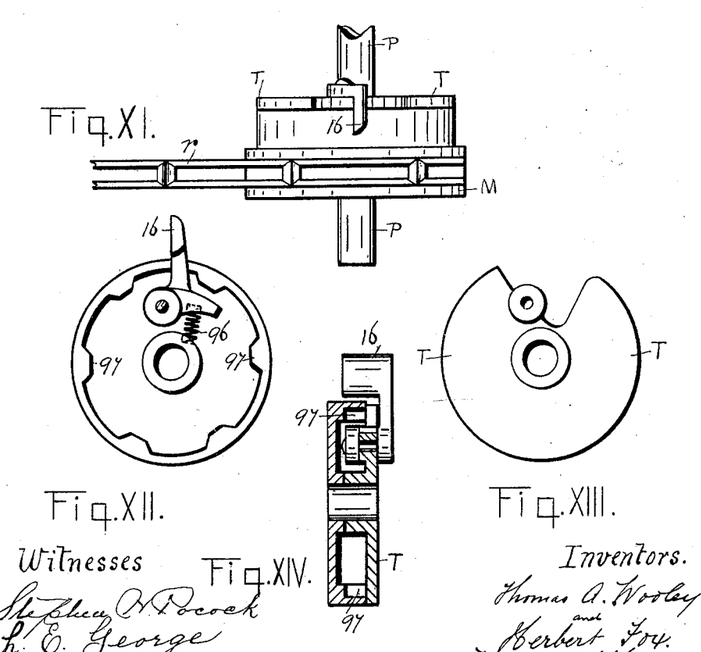
Fig. 12 is an inner face view of the interior of the box part of the clutch, showing the teeth of the box and the inner face of the clutch and with the projecting catch pivoted to the clutch and a spring which presses against the hub of the clutch and against the catch. This catch is shown in position as it would appear when held by the operating stop-lever.
Fig. 13 is an inner face view of the clutch, showing its central shaft-hub, the pivotal hub of the catch, and an opening to allow the catch to operate.
Fig. 14 is a sectional central view of Fig. 12.

The receiving end of the machine is carried on the tube C, previously referred to, and the discharging end is carried by means of a bent tube 75, which is supported at each end by caster-wheels 76, as in Fig. 8. The central part of said bent tube 75 is held by the clevis 77 and bolts 78 to the lower plate 79, which has pivotal connection to the upper central plate 80 of the machine by means of brackets 81 and 82, which are secured to the plates 79 and 80, as in Fig. 9, and the pivotal rod 83, which passes through said brackets and is fastened to the same. The plate 80 is secured to the upper part of the transverse end part of frame A and to the upper part of the oblique tube part 22 of the needle and knotter columns 21 and R, as at 85. The braces 84 are secured to the bent tube 75 and to the plate 80 to retain the bent tube 75 at right angles to the plate 80, hence at right angles and transversely to the machine, as shown in Fig. 1 of the drawings. This pivotal connection of the bent tube 75 to the discharging end of the frame is to allow the machine to pass over uneven ground, so as not to strain or unbalance the machine, which is an important feature in the operation thereof. All the sprockets referred to may be provided with side flanges flush with or even past the points of the teeth and the chains to conform to said construction. This feature would prevent entanglement of the straw with the sprockets, especially so at the receiving end of the machine.

The operation of this machine is caused by the motion of a sheaf as discharged from the binder engaging the trip-lever S to release the stop-lever Y from the catch 16 of the clutch T on shaft P to revolve said shaft. The said sheaf at this time rests on a blade $m'$ of the reel and the butt of the sheaf on the bottom. The shaft P causes the reel to revolve one half-revolution, and at the same time the endless chains $e$, with the transverse slats $f$, make one half-revolution. The slat at the sheaf-receiving end engages the transverse spring-board $g$ to cause the board to engage the butt-end of the sheaf. The said slat immediately engages said sheaf and assists the reel in placing the sheaf in vertical position. The blade $m^2$ then engages the following side of the sheaf, causing the sheaf to erect on its butt-end in the shock-receptacle. The operation of these several parts is repeated until the shock-receptacle is full. The whole of the sheaves forming the shock is then bound together by the needle and the knotter-shafts, which are operated by a pivoted stop-rod 27, the end of which butts against a catch on clutch 31, secured on the lower end of the knotter-shaft. When this stop-rod 27 is lifted by means of a cord attached to said rod at 32 and to the driver or by other approved mechanism, the catch of the clutch 31 is released. Consequently the knotter-shaft 19 revolves once, causing the needle on the needle-shaft 20 to engage the knotter on the knotter-shaft to bind the shock, which may contain eight or ten sheaves, more or less, as the case may be. The lifting of the rod 27 releases the catch on the clutch 31 on the lower end of the knotter-shaft and allows the needle-shaft also to revolve once. At the time that the knotter-shaft is revolved the needle-shaft is oscillated by means of a crank 37 on the lower end of the needle-shaft. This crank is connected by mechanism to the clutch 31. At the same time that the needle and the knotter-shafts are in operation the shock-discharge arms 40 are given one half-revolution, and the said arms carry the shock in vertical position to the discharging end of the machine and off the same to the ground.

The discharge-arms 40 are operated by mechanism previously described, and when the said arms are in operation one of the disengaged arms, which is moving toward the receiving end of the machine, engages the incline lip 71 on the vertical rod 42 to depress said rod, therefore depressing the stop-bar 45, that the same may engage the catch 47 on the clutch 48, secured on shaft O, to stop the same, therefore stopping the discharge-arms in position at each half-revolution of said arms, and so on at the discharge of each shock. The clutch 48 is similar to the clutches T and 31, excepting that the construction of the clutch 48 is in reversed order. All these clutches operate in a similar manner and for a similar purpose—namely, that when the catch of the clutch is released the clutch, with its shaft, revolves.

Various changes in the form, proportion, and minor details of this machine may be resorted to without departing from the spirit and scope thereof. Hence we do not consider ourselves limited to the precise construction herein shown.

Having now particularly described and ascertained the nature and object of our invention and in what manner the same is to be performed, what we desire to secure by Letters Patent is—

1. In a machine for shocking grain, a frame, sides secured to said frame by means of straps, an inner sheaf-receptacle supported by said sides, at the receiving end of the machine, spaces formed between the said receptacle and said sides, sprockets in said spaces and journaled in bearings on said sides and in the sheaf-receptacle; chains on said sprockets, transverse slats on said chains to place the butts of the sheaves and means to drive said sprockets, substantially as specified.

2. In a machine for shocking grain, a frame, sides secured to said frame, an inner sheaf-receptacle supported by said sides, sprockets journaled between said sides and receptacle, chains on said sprockets, transverse slats on said chains, a spring-board pivoted at the receiving end of the receptacle, said transverse slats capable of operating said spring-board to place the butts of the sheaves downward to allow the transverse slats to place the sheaves into the shock-receptacle of the machine, and actuating mechanism for said sprockets, substantially as specified.

3. In a machine for shocking grain, a frame, sides secured to said frame, an inner sheaf-receptacle supported by said sides, a bent trip-lever with end crank suspended over the receiving end of the sheaf-receptacle, a support for said trip-lever, said support fastened to the receiving end of the machine, a stop-lever pivoted to the side of the machine at the receiving end, a vertical rod connecting said stop-lever and crank, a catch and clutch, the opposite end of said lever capable of releasing said catch and clutch upon the reception of a sheaf which engages the said suspended bent rod to allow the sheaf to be placed into position by mechanism, substantially as specified.

4. In a machine for shocking grain, a sheaf-receptacle and a shock-receptacle, a frame to support said receptacles, sprockets mounted on the ends of the sheaf-receptacle, and on the outer sides thereof; chains on said side sprockets, lower side sprockets to receive said chains, and side rollers mounted on the lower part of the sides of the sheaf-receptacle, said chains passing under said rollers, transverse slats on said chains, said rollers to allow freedom of transit to said slats, and an opening at the junction of the floors of said receptacles to allow the operation of the transverse slats, substantially as specified.

5. In a machine for shocking grain, a frame, sides secured to said frame, an inner sheaf-receptacle supported by said sides, sprockets mounted between said sides and receptacle, a lower transverse shaft below said receptacle and mounted on said frame, sprockets on said shaft, oppositely-disposed chains engaging with said sprockets, side rollers pivoted to the lower part of said receptacle and adapted to guide said chains, transverse slats on the chains, a spring-board pivoted to the receiving end of said receptacle, the transverse slats capable of engaging with the under side of said spring-board at the reception of each sheaf, and to place the butt-ends of the sheaves downward, to allow said transverse slats to forward the sheaves, toward the discharging end of the machine, and actuating mechanism connected to said shaft, substantially as specified.

6. In a machine for shocking grain, a frame, a sheaf-receptacle and a shock-receptacle secured on said frame, a bent trip-lever suspended over the receiving end of said sheaf-receptacle, a crank on the forward end of the horizontal part of said trip-lever, a bent supporting-rod for said trip-lever, said supporting-rod fastened to the receiving end of the machine, a stop-lever pivoted to the side of the machine, at the receiving end thereof, a vertical rod connecting the end of said stop-lever and crank, a catch and clutch, the opposite end of said lever capable of releasing said catch and clutch, upon the reception of a sheaf which engages the said suspended bent rod, to allow the sheaf to be placed into position, oppositely-disposed sprockets mounted on the outer sides of the sheaf-receptacle, a transverse shaft capable of revolving in bearings on said frame and underneath said sheaf-receptacle, sprockets on said shaft, chains with transverse slats on said sprockets, guide-rollers at the receiving end of the sheaf-receptacle for said chains, and actuating mechanism for said shaft, substantially as specified.

7. In a machine for shocking grain, a frame, a sheaf-receptacle secured to said frame, a vertical side post with lower extension transversely secured on said frame, a vertically-adjustable transverse bearing on said post, a reel mounted on said bearing and immediately over the said receptacle and means for revolving the reel one half-revolution at the reception of each sheaf in the receptacle, substantially as specified.

8. In a machine for shocking grain, a frame, a sheaf-receptacle secured to said frame, a reel capable of revolving over said receptacle, a vertical side post with lower part extending transversely on said frame and fastened thereto, a vertically-adjustable bearing on said post to support said reel, a main transverse drive-shaft mounted on said frame and revolved by an attached binder-machine, and actuating mechanism connecting said main shaft to said reel to revolve the same one half-turn at each reception of a sheaf, substantially as specified.

9. In a machine for shocking grain, a frame, a sheaf-receptacle secured to said frame, a reel, a vertical side post with lower extension transversely secured on the upper side of said frame, a transverse bearing on said post, said bearing capable of vertical adjustment, said reel capable of revolving with its shaft in said bearing, an inclined shaft capable of revolving in a lower bearing on said frame, an upper sleeve for said shaft, a vertically-adjustable arm on said post, a slot in said arm to allow said arm to fasten to said incline-shaft sleeve, a gear-wheel secured on the shaft of the reel, a gear-wheel secured on said incline shaft to mesh into said wheel and drive the reel by actuating mechanism connected to said incline shaft to revolve the reel one half-revolution at the reception of a sheaf, substantially as specified.

10. In a machine for shocking grain, a frame, sides secured to said frame, a vertical knotter-shaft column and a vertical needle-shaft column, said columns connected by an oblique tube secured to the under side of said frame, vertical shafts through said columns, collars on said shafts resting on the columns, said sides inclining downward toward the discharge end of the machine, outer flanges on said sides, and supported by said columns, horizontally-inclined sprockets with chains supported by said flanges, at both ends thereof, horizontally-inclined discharging-arms, attached to said chains, and actuating mechanism connected to said sprockets at the receiving end of the shock-receptacle, to revolve said discharging-arms one half-revolution, substantially as specified.

11. In a machine for shocking grain, a frame, a shock-receptacle forming a part thereof, said receptacle widening out toward and to the discharging end thereof, the sides of said receptacle inclining downward toward and to the said discharging end, flanges on said sides, sprockets mounted at both ends of said inclined flanges and supported by said flanges and capable of revolving with chains in line with said inclines, arms on said chains, upright inclined shafts, at right angles to said chains, lower bearings secured to the frame for said shafts, the upper end of said shafts supported by said upper flange-bearings, said upper incline sprockets secured on said incline shafts, lower sprockets on said shafts, a chain connecting said sprockets, and actuating mechanism to revolve the chains with arms one half-revolution at the discharge of each shock, substantially as specified.

12. In a machine for shocking grain, a frame, sides secured to said frame, a sheaf-receptacle secured to said sides at the receiving end of the machine, said sides and frame widened out at the shock-discharging end of the machine, a shock-receptacle between said widened-out parts, said sides being widened out to facilitate the discharge of said shock, said sides of the shock-receptacle inclining downward toward and to the discharging end of the machine to facilitate the discharge of the shock in a vertical position, and an opening formed between the floors of said receptacles, spaces formed in the sheaf-receptacle, sprockets mounted in said spaces, chains on said sprockets, transverse slats on said chains to place the sheaves, said floor opening to allow said slats to operate, and mechanism to actuate said sprockets to revolve the same one half-revolution at the reception of each sheaf, substantially as specified.

13. In a machine for shocking grain, a frame, a sheaf-receptacle and a shock binding and discharging receptacle supported on said frame, adjusting-bars having a series of recesses said bars secured to the under side of the frame immediately below said sheaf-receptacle, a transverse tube fitting in any of the said recesses to support the said part of the machine and to adjust the machine endwise, said tube extending to and secured to a binder-machine, a pin through the outer end of said tube to engage with the outer side of the recessed adjusting-bar farthest from the binder, and a strap or collar on the said extending part of the tube to engage with the side of the adjusting-bar next to the binder to hold the shock-machine in position, substantially as specified.

14. In a machine for shocking grain, a frame widened out at the discharging end and supported on caster-wheels, sides secured to the frame, a shock-receptacle between said sides, upper flanges on the sides to strengthen the same, vertical needle and knotter shaft columns in position, an oblique tube connecting said columns, said tube fastened to the under side of said frame, said flanges fastened to said columns, a main shaft, a bracket-bearing with side projection, secured to the side of the machine next to the connected binder, to support said main shaft, a sprocket secured on said main shaft, a transverse shaft supported by said bracket-bearing, and a bearing on the frame of the machine, a sprocket mounted loosely on said transverse shaft, a bearing on the lower part of the knotter-column, a shaft in said bearing, and in the lower part of said bracket-bearing, a sprocket mounted loosely on said shaft, an intermediate shaft journaled in said bracket-bearing, and in a bearing secured to the frame, a sprocket mounted loosely on said shaft, a chain connecting said sprockets, and mechanism connected to the sprockets to transmit power to the machine as described.

15. In a machine for shocking grain, a frame, sides secured to said frame, a sheaf-receptacle in said sides at the sheaf-receiving end thereof, a transverse spring-board pivoted to the sides of said receptacle and extending to the end of the machine, coil tension-springs on the pivotal ends of said spring-board to normally incline said board toward the receiving end of the machine.

16. In a machine for shocking grain, a frame, a vertical side post with transverse lower extension, secured on and to said frame, a reel suitably mounted on a transverse shaft, a transverse bearing secured to said post, said reel capable of revolving with its shaft in said bearing, a gear-wheel secured on said shaft, an incline shaft in a lower bearing secured to said frame, a bearing or sleeve on said incline shaft, said bearing adjustably connected to an arm on said post, a gear-wheel secured on said incline shaft above said sleeve, to mesh into the gear-wheel on the said reel-shaft, a gear-wheel secured on the lower part of the incline shaft, a transverse shaft capable of revolving in bearings secured to said frame, a gear-wheel on said transverse shaft to mesh into said lower wheel, a loosely-revolving sprocket on the opposite end of the transverse shaft, a bearing connected to the frame, said opposite end of the transverse shaft supporting the connected bearing, a clutch connected to said sprocket, a catch on said clutch and means to actuate to stop said clutch to revolve said reel one half-revolution at the reception of each sheaf, substantially as specified.

17. In a machine for shocking grain, a frame, sides secured to said frame, opposite incline shafts supported in bearings on the sides of said frame, a sprocket with bevel-wheel to revolve loosely on the lower end of one of said shafts and below said frame, a bevel-wheel secured on the same said shaft, a shaft at right angles with said frame and journaled in said bearing, a connecting-bearing secured to the frame as a bearing for the other end of said shaft, a sprocket to run loosely on said shaft, a clutch and bevel-wheel secured on said shaft, said bevel-wheel to drive said wheels on the incline shaft, a chain transversely connecting said sprockets on the incline shafts, discharge-arm chains driven by said inclined shafts, and mechanism to actuate said clutch to operate said discharge-arm chains one half-revolution at the charge of each shock, substantially as specified.

18. In a machine for shocking grain, a frame, sides secured to said frame, a floor on said frame, said sides inclining downward to the discharging end of said frame, inclined shafts on each side of the frame, and located at the beginning of said inclined portion of the sides, and at right angles therewith, bearings on the sides of the frame for the lower parts of said shafts, sprockets secured on the upper parts of said shafts, upper strengthening-flanges on the incline sides, bearings secured to said flanges to support said shafts, sprockets at the discharging end of said flanges, bearings secured to said incline flanges to support said sprockets, chains connecting said sprockets, arms secured to said chains, to discharge the shock, sprockets secured to the lower ends of said shafts and a transversely-operating chain connecting said lower sprockets, and means for actuating said chains with arms at the discharge of each shock, substantially as specified.

19. In a machine for shocking grain, a frame, sides secured to said frame, vertical needle and knotter columns with lower oblique tube fastened obliquely to the under side of said frame, vertical needle and knotter shafts supported by said columns, collars on said shafts resting on said columns, a cam on the knotter-shaft collar, a vertical rod to engage with said cam, a horizontal stop-bar, the lower end of said rod pivoted to said stop-bar, a main drive-shaft, collars on said shaft to hold loosely one end of said stop-bar which is loosely connected on said shaft and between said collars, an incline lip on said vertical rod, a shaft O, chains carrying discharge-arms driven thereby, said discharge-arms to engage with said lip to lower said rod, a clutch with catch secured on said shaft, the other end of said stop-bar to engage with said catch at the said lowering of the vertical rod to cause said clutch to stop, and allow the discharge-arm chains to stop, at one half-revolution at the discharge of each shock, as described.

20. In a machine for shocking grain, a frame, sides secured to said frame, an inner sheaf-receptacle secured to said sides, sprockets mounted between said sides and receptacle, lower sprockets on a transverse shaft, chains connecting said mounted sprockets of the receptacle, and said lower sprockets, chain-guide rollers mounted on the lower receiving end of said receptacle to engage with said chains, transverse slats on said chains to place the sheaves in position in the shock-receptacle, a stop-lever pivoted to a side of the machine, a branch on said lever, said transverse bars to engage with said branch to raise one end of said lever and cause the depression of the other end of said lever, a catch on a clutch, a transverse shaft, said clutch secured to said shaft, the depressed end of said lever to engage said catch to cause said transverse slats to stop at one half-revolution of the chains at the reception of each sheaf, substantially as specified.

21. In a machine for shocking grain, a bent transverse tube with casters suitably mounted on the ends thereof, a lower longitudinal plate, the central part of said plate fastened to the central part of said tube, an upper longitudinal plate, a frame, needle and knotter columns, with lower oblique tube fastened to said frame, one end of said upper longitudinal plate fastened to said oblique tube, and the other end of said upper plate fastened to said frame at the discharging end thereof, brackets fastened to the under side of said upper plate, near the ends thereof, and brackets fastened to the upper side of said lower plate, to conform therewith, a longitudinal rod passing through said brackets, as a pivotal center to said transverse caster-tube, and braces connecting said caster-tube to the said lower plate, as described.

In testimony whereof we affix our signatures in presence of witnesses.

THOMAS A. WOOLEY.
HERBERT FOX.

Witnesses:
JOHN H. HENDRY,
ARTHUR O'HEIR,
WILLIAM IRWIN.